US007367061B2

(12) United States Patent
Tischer

(10) Patent No.: US 7,367,061 B2
(45) Date of Patent: Apr. 29, 2008

(54) SYSTEMS, METHODS, AND A STORAGE MEDIUM FOR STORING AND SECURELY TRANSMITTING DIGITAL MEDIA DATA

(75) Inventor: Steven Tischer, Atlanta, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 851 days.

(21) Appl. No.: 10/812,432

(22) Filed: Mar. 30, 2004

(65) Prior Publication Data

US 2005/0229014 A1 Oct. 13, 2005

(51) Int. Cl.

| | |
|---|---|
| ***G06F 7/04*** | (2006.01) |
| ***G06F 17/30*** | (2006.01) |
| ***G06K 9/00*** | (2006.01) |
| ***H03M 1/68*** | (2006.01) |
| ***H04K 1/00*** | (2006.01) |
| ***H04L 9/00*** | (2006.01) |
| ***H04L 9/32*** | (2006.01) |
| ***H04N 9/32*** | (2006.01) |
| ***H04N 7/16*** | (2006.01) |
| ***H04N 7/173*** | (2006.01) |

(52) U.S. Cl. .......................... 726/27; 726/30; 713/162; 713/189; 713/193; 725/4; 725/88; 725/92; 725/102; 725/115; 380/242

(58) Field of Classification Search ..................... None
See application file for complete search history.

(56) References Cited

U.S. PATENT DOCUMENTS

2003/0235392 A1* 12/2003 Boston et al. ................ 386/46
2004/0213273 A1* 10/2004 Ma ............................ 370/401
2004/0258390 A1* 12/2004 Olson .......................... 386/46

* cited by examiner

*Primary Examiner*—Benjamin E Lanier
(74) *Attorney, Agent, or Firm*—Cantor Colburn LLP

(57) ABSTRACT

Systems, methods, and a storage medium for storing and securely transmitting digital media data in a networked system are provided. The method includes determining an amount of memory for storing the digital media data. The method further includes querying a plurality of network computers to determine an amount of available memory in a plurality of memory storage devices associated with the plurality of network computers. The method further includes receiving the digital media data and partitioning the digital media data into a plurality of digital media data sets. The method further includes encrypting the plurality of digital media data sets into a plurality of encrypted digital media data sets using at least one encryption key value. The method further includes storing the plurality of encrypted digital media data sets in at least two of the plurality of memory storage devices associated with the plurality of network computers. The method further includes retrieving the plurality of encrypted digital media data sets and transmitting the plurality of encrypted digital media data sets to a decryption device. Finally, the method includes decrypting the plurality of encrypted digital media data sets at the decryption device using at least one encryption key value to obtain the digital media data.

14 Claims, 4 Drawing Sheets

SYSTEMS, METHODS, AND A STORAGE MEDIUM FOR STORING AND SECURELY TRANSMITTING DIGITAL MEDIA DATA

FIELD OF INVENTION

The present invention relates to systems, methods, and a storage medium for storing and securely transmitting digital media data.

BACKGROUND

Service providers have allowed registered users to store digital media data on digital video recorders (DVRs) for later viewing. In particular, when a user selects to record the digital media data, the DVR stores the digital media data in an internal memory. Thereafter, when the user selects to view the digital media data, the DVR displays the data on a television. A disadvantage of the DVR, however, is that the DVR memory may not be able to store a plurality of digital media data sets that a user has selected due to its limited memory capacity.

Thus, there is a need for a system that allows for the distributed storage of digital media data selected by a user that has increased memory capacity as compared to other systems.

SUMMARY OF THE INVENTION

A method for storing and securely transmitting digital media data in a networked system is provided. The method includes determining an amount of memory for storing the digital media data. The method further includes querying a plurality of network computers to determine an amount of available memory in a plurality of memory storage devices associated with the plurality of network computers. The method further includes receiving the digital media data and partitioning the digital media data into a plurality of digital media data sets. The method further includes encrypting the plurality of digital media data sets into a plurality of encrypted digital media data sets using at least one encryption key value. The method further includes storing the plurality of encrypted digital media data sets in at least two of the plurality of memory storage devices associated with the plurality of network computers. The method further includes retrieving the plurality of encrypted digital media data sets and transmitting the plurality of encrypted digital media data sets to a decryption device. Finally, the method includes decrypting the plurality of encrypted digital media data sets in the decryption device using the at least one encryption key value to obtain the digital media data.

A system for storing and securely transmitting digital media data is provided. The system includes a first computer configured to determine an amount of memory for storing the digital media data. The system further includes a first plurality of network computers configured to communicate with the first computer. The first computer is configured to query the first plurality of network computers to determine an amount of available memory in a first plurality of memory storage devices associated with the first plurality of network computers. The first computer is further configured to receive the digital media data and to partition the digital media data into a plurality of digital media data sets. The first computer is further configured to encrypt the plurality of digital media data sets into a plurality of encrypted digital media data sets using at least one encryption key value and to store the plurality of encrypted digital media data sets in at least two of the first plurality of memory storage devices associated with the first plurality of network computers. The first computer is further configured to retrieve the plurality of encrypted digital media data sets and to transmit the encrypted digital media data sets to a decryption device. Finally, the system includes a decryption device configured to receive the plurality of encrypted digital media data sets and to decrypt the plurality of encrypted digital media data sets using the at least one encryption key value.

An article of manufacture including a computer storage medium having a computer program encoded therein for storing and securely transmitting digital media data in a networked system is provided. The computer storage medium includes code for determining an amount of memory for storing the digital media data. The computer storage medium further includes code for querying a plurality of network computers to determine an amount of available memory in a plurality of memory storage devices associated with the plurality of network computers. The computer storage medium further includes code for receiving the digital media data and partitioning the digital media data into a plurality of digital media data sets. The computer storage medium further includes code for encrypting the plurality of digital media data sets into a plurality of encrypted digital media data sets using at least one encryption key value. The computer storage medium further includes code for storing the plurality of encrypted digital media data sets in at least two of the plurality of memory storage devices associated with the plurality of network computers. The computer storage medium further includes code for retrieving the plurality of encrypted digital media data sets and transmitting the plurality of encrypted digital media data sets to a decryption device. Finally, the computer storage medium includes code for decrypting the plurality of encrypted digital media data sets at the decryption device using at least one encryption key value to obtain the digital media data.

Other systems, methods, and computer program products according to embodiments will become or are apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION OF THE INVENTION

Figure 1:
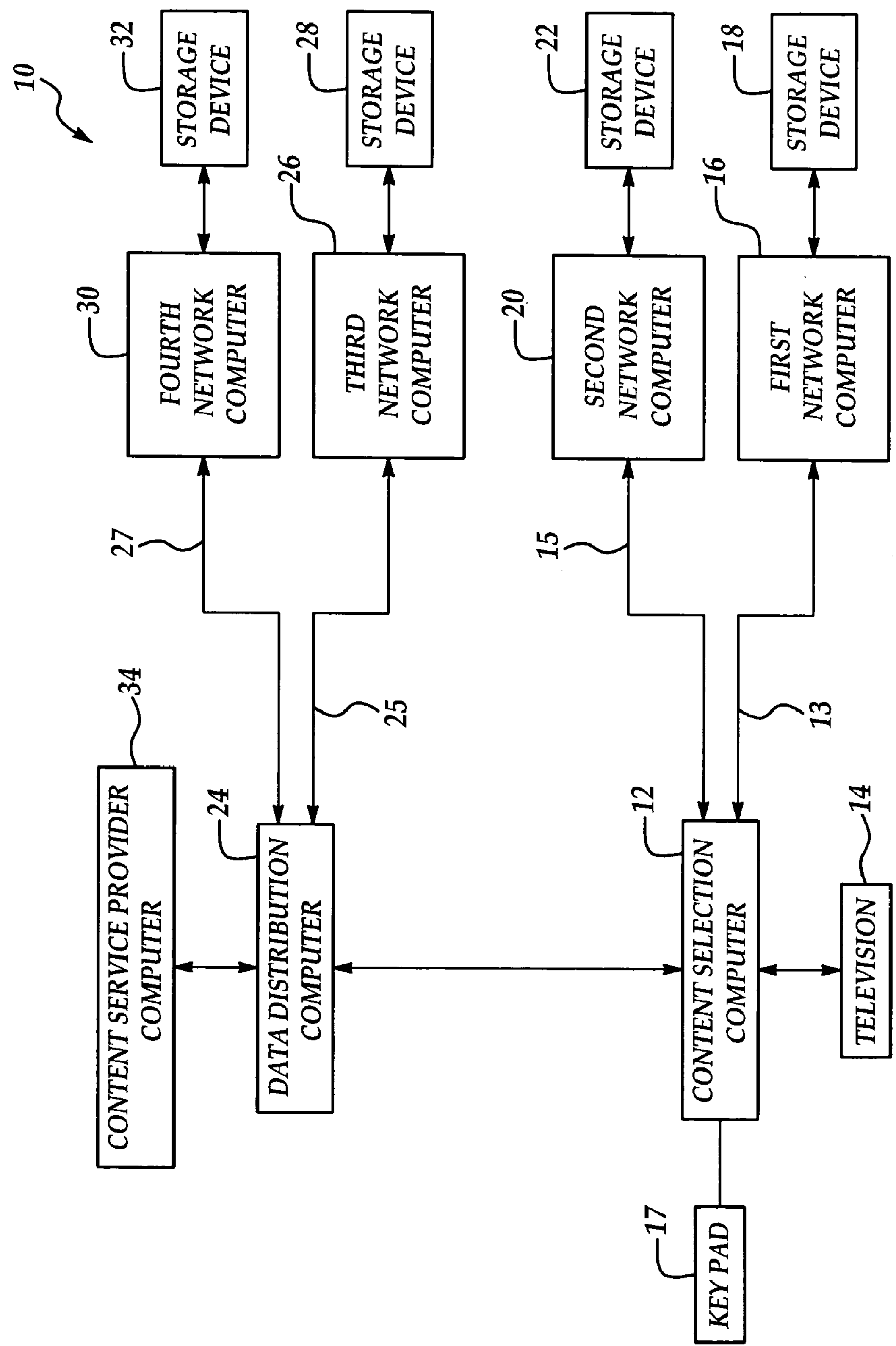
FIG. 1 is a schematic of a system for storing and securely transmitting digital media data.

Referring to the drawings, identical reference numerals represent identical components in the various views. Referring to FIG. 1, a system 10 for storing and transmitting digital media data is provided. For purposes of discussion, digital media data is defined as digitally generated video data, audio data, or image data. The system 10 includes a content selection computer 12, a television 14, a first network computer 16, a memory storage device 18, a second network computer 20, a memory storage device 22, a data distribution computer 24, a third network computer 26, a memory storage device 28, a fourth network computer 30, a memory storage device 32, and a content service provider computer 34.

Before describing the components of system 10 in detail, a brief overview of the functionality of system 10 will be provided. The system 10 allows a user of the content selection computer 12 to select digital media data, for either immediately viewing the digital media data or for viewing the digital media data at a later time. For example, a user could select a predetermined movie for viewing at a later time. Thereafter, the content selection computer 12 can send a data message to the data distribution computer 24 identifying the digital media data. Thereafter, the data distribution computer 24 can send a data message to the content service provider computer 34 requesting the digital media data. Thereafter, the content service provider computer 34 can transmit the requested digital media data to the data distribution computer 24. The data distribution computer 24 can partition a stream of digital media data, and encrypt and store portions of the digital media data utilizing the third and fourth network computers 26, 30 as will be explained in greater detail below. Further, the data distribution computer 24 can transmit other portions of the encrypted digital media data to the content selection computer 12. The content selection computer 12 can store portions of the encrypted digital media data utilizing the first network computer 16 and a second network computer 20 as will be explained in greater detail below.

Thereafter, when a user of the content selection computer 12 selects to view the digital media data, the content selection computer 12 can query the data distribution computer 24 for the portions of encrypted digital media data stored by the third and fourth network computers 26, 30. Further, the content selection computer 12 can query the first and second network computers 16, 20 for the other portions of encrypted digital media data stored by the computers 16, 20. Thereafter, the content selection computer 12 can decrypt the portions of the encrypted digital media data to obtain the originally stored digital media data, and transmit the digital media data to the television 14 for viewing by a user.

Referring to FIG. 1 the components of system 10 will now be described. The content service provider computer 34 is provided to store a plurality of digital media data elements. The content service provider computer 34 operably communicates with the data distribution computer 24.

The data distribution computer 24 is provided to manage the retrieval of digital media data from the content service provider computer 34. The data distribution computer 24 is further provided to encrypt and store the digital media data in system 10 as will be described in greater data below. As shown, the data distribution computer 24 operably communicates with the content service provider computer 34, the content selection computer 12, and the third and fourth network computers 26, 30.

The third and fourth network computers 26, 30 are provided to determine the amount of available memory in storage devices 28, 32, respectively for storing digital media data sets. A digital media data set is a predetermined portion of the digital media data. Further, computers 26, 30 are provided to store digital media data sets in storage devices 28, 32, respectively, and to retrieve the digital media data sets from devices 28, 32, respectively. Each of the storage devices 28, 32 includes either non-volatile or volatile memory. Further, the non-volatile or volatile memory can be implemented using any of a number of known memory devices such as PROMs, EPROMs, EEPROMS, flash memory or any other electric, magnetic, optical or combination memory device capable of storing data. The third network computer 26 operably communicates with the data distribution computer 24 and the memory storage device 28. The fourth network computer 30 operably communicates with the data distribution computer 24 and the memory storage device 32. In the illustrated embodiment, data distribution computer 24 operably communicates with the third and fourth network computers 26, 30 via communication lines 25, 27, respectively. It should be noted, however, that in an alternate embodiment, computer 24 could communicate with computers 26, 30 using radio-frequency ("RF") transceivers. Further, in another alternate embodiment, any number of additional network computers could operably communicate with the data distribution computer 24 to allow for increased memory storage capacity and secured distribution of digital media data. Still further, in another alternate embodiment, additional memory storage devices could communicate with each of the computers 26, 30 for increased memory storage capacity.

The content selection computer 12 is provided to accept a user request via the keypad 17 for storing digital media data for relatively quick retrieval for later viewing. The keypad 17 can be integrated within content selection computer 12 or can communicate with content selection computer 12 via an RF communication link. The content selection computer 12 operably communicates with the television 14, the data distribution computer 24, and the first and second network computers 16, 20.

The first and second network computers 16, 20 are provided to determine an amount of available memory in storage devices 18, 22, respectively, for storing digital media data. Further, computers 16, 20 are provided to store the digital media data sets in storage devices 18, 22, respectively, and to retrieve the digital media data sets from devices 18, 22, respectively. Each of storage devices 18, 22 includes either non-volatile or volatile memory. Further, the non-volatile or the volatile memory can be implemented using any of a number of known memory devices such as PROMs, EPROMs, EEPROMS, flash memory or any other electric, magnetic, optical or combination memory device capable of storing data. The first network computer 16 operably communicates with the content selection computer 12 and the memory storage device 18. The second network computer 20 operably communicates with the content selection computer 12 and the memory storage device 22. In the illustrated embodiment, the content selection computer 12 operably communicates with the first and second network computers 16, 20 via communication lines 13, 15, respectively. It should be noted, however, that in an alternate embodiment, content selection computer 12 could communicate with computers 16, 20 using RF transceivers. Further, in another alternate embodiment, any number of additional network computers could operably communicate with the content selection computer 12 to allow for increased memory storage capacity. Still further, in another alternate embodiment, additional memory storage devices could communicate with each of the computers 16, 20 for increased memory storage capacity.

Figure 2:
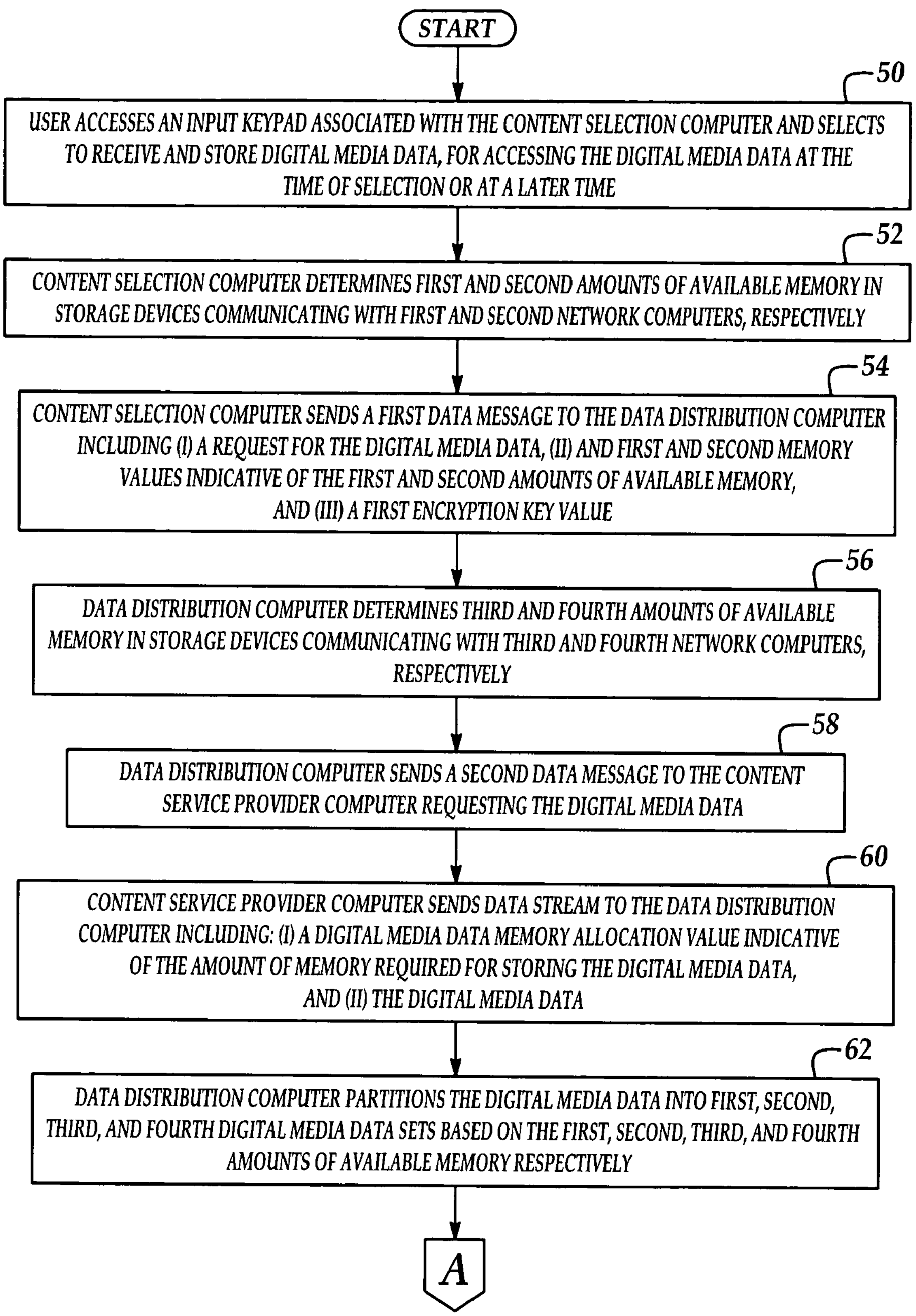
FIGS. 2, 3, and 4 are flowcharts of a method for storing and securely transmitting digital media data using the system of FIG. 1.
Figure 3:
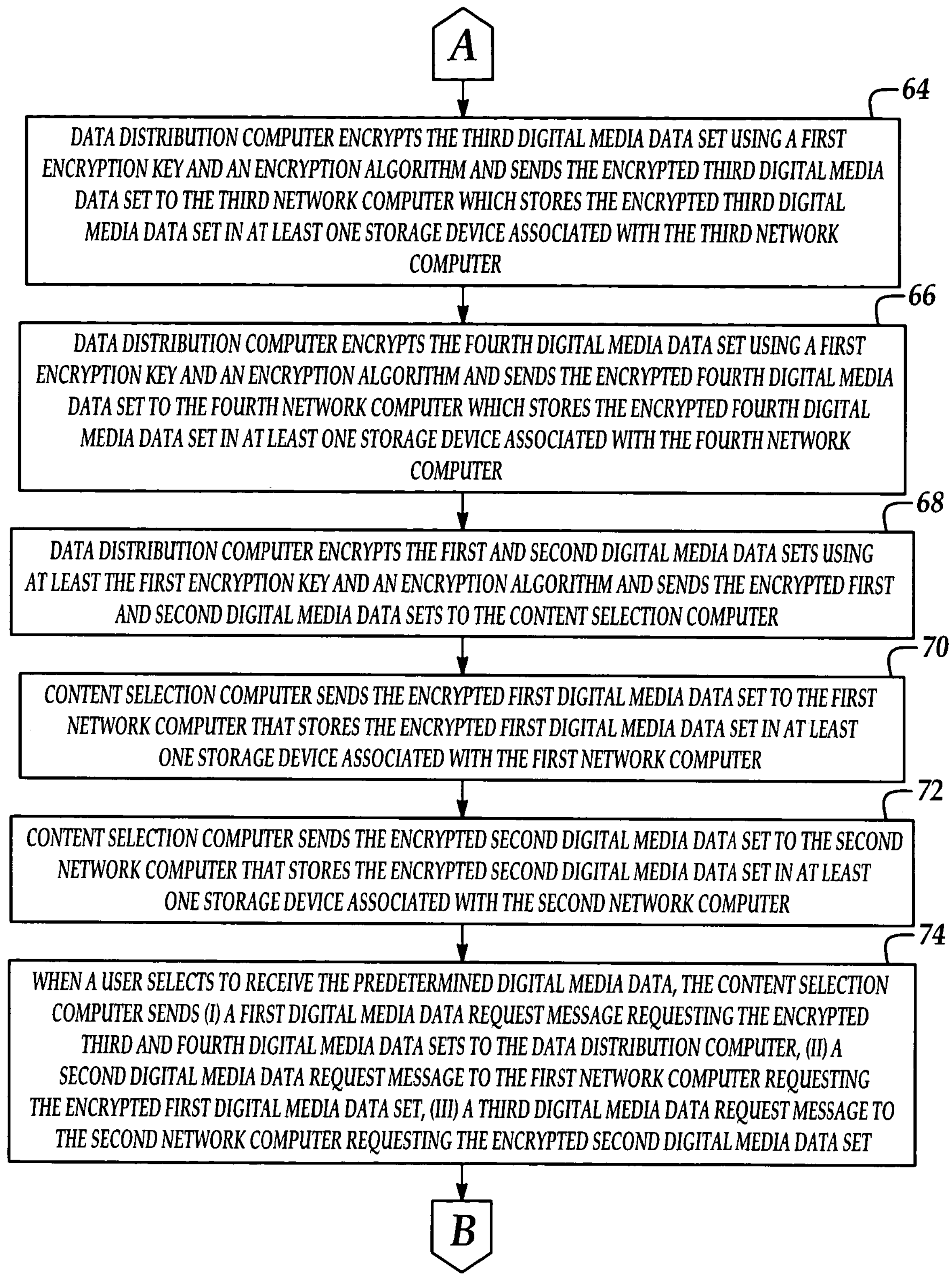
Figure 4:
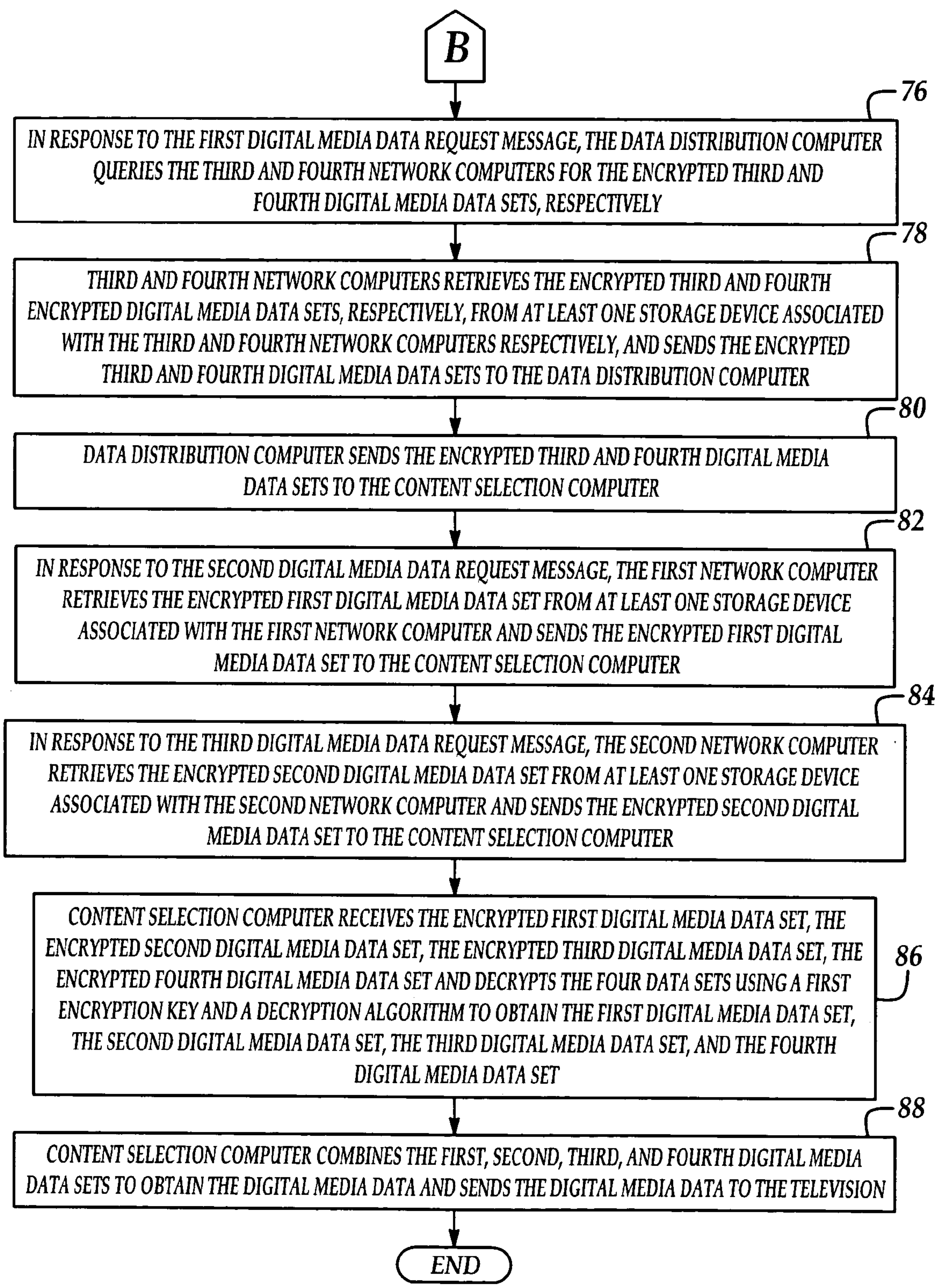

Referring to FIGS. 2, 3, and 4, a method for storing and transmitting digital media data will now be explained. The following method utilizes a symmetric encryption or a single encryption key value for encrypting and decrypting digital media data sets. In an alternate embodiment, however, asymmetric encryption using a private key and a public key could be used for encryption and decryption of the digital media data sets stored in system 10. Still further, in another alternate embodiment, a distinct symmetric encryption value or a distinct asymmetric encryption pair of values could be utilized for encrypting and decrypting each digital media data set that is stored in system 10.

At step 50, a user accesses an input keypad 17 associated with the content selection computer 12 and selects to receive and store digital media data, for either immediately accessing the digital media data or accessing the digital media data at a later time.

At step 52, the content selection computer 12 determines first and second amounts of available memory in storage devices 18, 22 communicating with first and second network computers 16, 20, respectively. In particular, the content selection computer 12 queries the computers 16, 20 to determine an amount of available memory. Thereafter, the computers 16, 20 query the memory storage devices 18, 22 to determine the amount of available memory in the devices 18, 22. Thereafter, the computers 16, 20 return first and second values to the content selection computer 12 indicating the first and second amounts of available memory, respectively.

At step 54, the content selection computer 12 sends a first data message to the data distribution computer 24 including: (i) a request for the digital media data, (ii) and first and second memory values indicative of the first and second amounts of available memory, and (iii) a first encryption key value.

At step 56, the data distribution computer 24 determines third and fourth amounts of available memory in storages devices 28, 32, respectively, communicating with third and fourth network computers, 26, 30, respectively. In particular, the data distribution computer 24 queries the computers 26, 30 to determine an amount of available memory. Thereafter, the computers 26, 30 query the memory storage devices 28, 32 to determine the amount of available memory in the devices 28, 32. Thereafter, the computers 26, 30 return third and fourth values, respectively, to the data distribution computer 24 indicating the third and fourth amounts of available memory.

At step 58, the data distribution computer 24 sends a second data message to the content service provider computer 34 requesting the digital media data.

At step 60, the content service provider computer 34 sends a digital media data stream to the data distribution computer 24 including: (i) a digital media data memory allocation value indicative of the amount of memory required for storing the requested digital media data, and (ii) the digital media data.

At step 62, the data distribution computer 24 partitions the digital media data into first, second, third, and fourth digital media data sets based on the first, second, third, and fourth amounts of available memory, respectively.

At step 64, the data distribution computer 24 encrypts the third digital media data set using a first encryption key and an encryption algorithm and sends the encrypted third digital media data set to the third network computer 26 which stores the encrypted third digital media data set in the memory storage device 28.

At step 66, the data distribution computer 24 encrypts the fourth digital media data set using a first encryption key and an encryption algorithm and sends the encrypted fourth digital media data set to the fourth network computer 30 which stores the encrypted fourth digital media data set in the memory storage device 32.

At step 68, the data distribution computer 24 encrypts the first and second digital media data sets using at least the first encryption key and an encryption algorithm and sends the encrypted first and second digital media data sets to the content selection computer.

At step 70, the content selection computer 12 sends the encrypted first digital media data set to the first network computer 16 that stores the encrypted first digital media data set in the memory storage device 18.

At step 72, the content selection computer 12 sends the encrypted second digital media data set to the second network computer 20 that stores the encrypted second digital media data set in the memory storage device 22.

At step 74, when a user selects to receive or view the predetermined digital media data, the content selection computer 12 sends (i) a first digital media data request message requesting the encrypted third and fourth digital media data sets to the data distribution computer 24, (ii) a second digital media data request message to the first network computer 16 requesting the encrypted first digital media data set, (iii) a third digital media data request message to the second network computer 20 requesting the encrypted second digital media data set.

At step 76, in response to the first digital media data request message, the data distribution computer 24 queries the third and fourth network computers 26, 30 for the encrypted third and fourth digital media data sets, respectively.

At step 78, the third and fourth network computers 26, 30 retrieve the encrypted third and fourth encrypted digital media data sets, respectively, from memory storage devices 28, 32, respectively, and send the encrypted third and fourth digital media data sets to the data distribution computer 24.

At step 80, the data distribution computer 24 sends the encrypted third and fourth digital media data sets to the content selection computer 12.

At step 82, in response to the second digital media data request message, the first network computer 16 retrieves the encrypted first digital media data set from memory storage device 18 and sends the encrypted first digital media data set to the content selection computer 12.

At step 84, in response to the third digital media data request message, the second network computer 20 retrieves the encrypted second digital media data set from memory storage device 22 and sends the encrypted second digital media data set to the content selection computer 12.

At step 86, the content selection computer 12 receives the encrypted first digital media data set, the encrypted second digital media data set, the encrypted third digital media data set, the encrypted fourth digital media data set, and decrypts the four encrypted data sets using a first encryption key and a decryption algorithm to obtain the first digital media data set, the second digital media data set, the third digital media data set, and the fourth digital media data set.

At step 88, the content selection computer 12 combines the first, second, third, and fourth digital media data sets to obtain the digital media data and sends the digital media data to the television which displays the digital media data.

The present systems, methods, and storage medium for storing and securely transmitting digital media data represents a substantial advantage over other systems and methods. In particular, the system 10 provides the technical effect of distributing the storage of digital media data among the plurality of memory storage devices. Thus, the system 10 provides for a substantially increased memory capacity for storing numerous digital media data elements that are selected by a user, as compared to conventional digital video recorders.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for storing and securely transmitting digital media data in a networked system, comprising:

determining an amount of memory for storing the digital media data;

at a content selection computer querying first and second network computers to determine an amount of available memory in first and second memory storage devices associated with the first and second network computers;

the content selection computer sending the amount of available memory in the first and second memory storage devices to a data distribution computer;

at the data distribution computer querying third and fourth network computers to determine an amount of available memory in third and fourth memory storage devices associated with the third and fourth network computers;

receiving the digital media data from a content service provider computer and partitioning the digital media data into a plurality of digital media data sets;

encrypting the plurality of digital media data sets into a plurality of encrypted digital media data sets using at least one encryption key value;

storing the plurality of encrypted digital media data sets in at least two of the first, second, third and fourth memory storage devices;

retrieving the plurality of encrypted digital media data sets and transmitting the plurality of encrypted digital media data sets to a decryption device; and, decrypting the plurality of encrypted digital media data sets in the decryption device using at least one encryption key value to obtain the digital media data.

2. The method of claim 1 wherein determining an amount of memory for storing the digital media data includes querying the content service provider computer for a memory storage value associated with the digital media data.

3. The method of claim 1 wherein encrypting the digital media data includes:

receiving at least one encryption key value from the decryption device; and, encrypting the digital media data using the encryption key value and an encryption algorithm.

4. The method of claim 1 wherein storing the plurality of encrypted digital media data sets includes:

sending a first encrypted digital media data set to the first network computer;

storing the first encrypted digital media data set in the first memory storage device associated with the first network computer;

sending a second encrypted digital media data set to the second network computer; and, storing the second encrypted digital media data set in the second memory storage device associated with the second network computer.

5. The method of claim 1 wherein retrieving the plurality of encrypted digital media data sets and transmitting the plurality of encrypted digital media data sets to the decryption device includes:

determining when a user has selected to receive the digital media data;

sending a first digital media data request message to the first network computer to retrieve a first encrypted digital media data set from the first network computer;

sending a second digital media data request message to the second network computer to retrieve a second encrypted digital media data set from the second network computer; and, transmitting the first and second encrypted digital media data sets to the decryption device.

6. The method of claim 1 wherein decrypting the plurality of digital media data sets includes:

receiving the plurality of encrypted digital media data sets; and, decrypting the plurality of digital media data sets using at least one encryption key value and a decryption algorithm.

7. The method of claim 1 further comprising displaying the digital media data on a television.

8. A system for storing and securely transmitting digital media data, comprising:

a content selection computer;

first and second network computers;

the content selection computer querying the first and second network computers to determine an amount of available memory in first and second memory storage devices associated with the first and second network computers;

a data distribution computer;

the content selection computer sending the amount of available memory in the first and second memory storage devices to a data distribution computer;

the data distribution computer querying third and fourth network computers to determine an amount of available memory in third and fourth memory storage devices associated with the third and fourth network computers;

a content service provider computer receiving a query for the digital media data from the data distribution computer;

the data distribution computer further configured to receive the digital media data and to partition the digital media data into a plurality of digital media data sets, the data distribution computer further configured to encrypt the plurality of digital media data sets into a plurality of encrypted digital media data sets using at least one encryption key value and to store the plurality of encrypted digital media data sets in at least two of the first, second, third and fourth memory storage devices, the data distribution computer further configured to retrieve the plurality of encrypted digital media data sets and to transmit the encrypted digital media data sets to a decryption device; and, the decryption device configured to receive the plurality of encrypted digital media data sets and to decrypt the plurality of encrypted digital media data sets using the at least one encryption key value.

9. The system of claim 8 wherein the decryption device is further configured to receive at least a portion of the plurality of encrypted digital media data sets and to store the portion of the plurality of encrypted digital media data sets in at least two of the first, second, third and fourth memory storage devices associated.

10. The system of claim 9 wherein the decryption device is further configured to retrieve the portion of the plurality of encrypted digital media data sets when a user selects to receive the digital media data.

11. The system of claim 10 wherein the decryption device is further configured to query the first computer to send the plurality of encrypted digital media data sets stored in the first memory storage devices when the user selects to receive the digital media data.

12. The system of claim 8 wherein the decryption device is further configured to send the digital media data to a television operably coupled to the decryption device.

13. The system of claim 8 wherein at least a portion of the available memory in the first plurality of memory storage devices comprises non-volatile memory.

14. An article of manufacture, comprising:

a computer storage medium having a computer program encoded therein for storing and securely transmitting digital media data in a networked system, the computer storage medium including code for implementing:

determining an amount of memory for storing the digital media data;

at a content selection computer querying first and second network computers to determine an amount of available memory in first and second memory storage devices associated with the first and second network computers;

the content selection computer sending the amount of available memory in first and second memory storage devices to a data distribution computer;

at the data distribution computer querying third and fourth network computers to determine an amount of available memory in third and fourth memory storage devices associated with the third and fourth network computers;

receiving the digital media data from a content service provider computer and partitioning the digital media data into a plurality of digital media data sets;

encrypting the plurality of digital media data sets into a plurality of encrypted digital media data sets using at least one encryption key value;

storing the plurality of encrypted digital media data sets in at least two of the first, second, third and fourth memory storage devices;

retrieving the plurality of encrypted digital media data sets and transmitting the plurality of encrypted digital media data sets to a decryption device; and, decrypting the plurality of encrypted digital media data sets at the decryption device using the at least one encryption key value to obtain the digital media data.

* * * * *